(12) United States Patent
Nagaoka et al.

(10) Patent No.: US 8,810,653 B2
(45) Date of Patent: Aug. 19, 2014

(54) VEHICLE SURROUNDINGS MONITORING APPARATUS

(75) Inventors: Nobuharu Nagaoka, Saitama (JP); Takayuki Tsuji, Saitama (JP); Yoichi Sugimoto, Saitama (JP); Morimichi Nishigaki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1894 days.

(21) Appl. No.: 11/712,533

(22) Filed: Feb. 28, 2007

(65) Prior Publication Data

US 2007/0211919 A1  Sep. 13, 2007

(30) Foreign Application Priority Data

Mar. 9, 2006 (JP) .................................. 2006-064511

(51) Int. Cl.
  *H04N 7/18*    (2006.01)
  *G06K 9/00*    (2006.01)

(52) U.S. Cl.
  CPC ........ *G06K 9/00369* (2013.01); *G06K 9/00791* (2013.01)
  USPC ............................ 348/148; 382/103; 382/190

(58) Field of Classification Search
  CPC .......... G06K 9/00369; G06K 9/00624; G06K 9/00791; G06K 9/00818; B60R 2300/106; B60R 2300/8033; B60R 2300/8093; H04N 5/33
  USPC .................................. 348/148; 382/103, 190
  See application file for complete search history.

(56) References Cited

U.S. PATENT DOCUMENTS

| 7,233,233 | B2 | 6/2007 | Taniguchi et al. |
| 7,330,568 | B2 | 2/2008 | Nagaoka et al. |

(Continued)

FOREIGN PATENT DOCUMENTS

| DE | 10 2004 012 811 A | 11/2004 |
| DE | 10 2005 026 875 A | 1/2006 |

(Continued)

OTHER PUBLICATIONS

J. Paul Getty Museum 'Formal Analysis': website http://www.getty.edu/education/teachers/building_lessons/formal_analysis.html.*
Wikipedia 'Edge detction'; website http://en.wikipedia.org/wiki/Edge_detection.*

*Primary Examiner* — Tonia L Dollinger
*Assistant Examiner* — June Sison
(74) *Attorney, Agent, or Firm* — Carrier Blackman & Associates, P.C.; Joseph P. Carrier; Jeffrey T. Gedeon (57) ABSTRACT

A vehicle surroundings monitoring apparatus capable of distinguishing and determining an object type with high reliability, particularly a vehicle surroundings monitoring apparatus capable of determining an object by distinguishing between a pedestrian and other objects among the objects with high reliability. The vehicle surroundings monitoring apparatus detects an object existing around a vehicle (10) from images obtained by cameras 2R and 2L mounted on the vehicle (10) and includes an object extraction process unit (steps 1 to 9) which extracts an object from the image, a width calculation process unit (steps 101 to 104) which calculates widths of the object in a plurality of height positions spaced at vertical intervals of the object extracted by the object extraction process unit, and an object type determination process unit (step 105) which determines the type of the object based on the widths calculated by the width calculation process unit.

8 Claims, 7 Drawing Sheets

(56) References Cited

U.S. PATENT DOCUMENTS

| | | | |
|---|---|---|---|
| 7,672,510 B2* | 3/2010 | Nagaoka et al. | 382/170 |
| 7,689,039 B2 | 3/2010 | Watabe | |
| 2002/0150308 A1* | 10/2002 | Nakamura | 382/286 |
| 2004/0183906 A1* | 9/2004 | Nagaoka et al. | 348/148 |
| 2005/0063565 A1* | 3/2005 | Nagaoka et al. | 382/104 |
| 2005/0111698 A1* | 5/2005 | Kawai | 382/103 |
| 2009/0041297 A1* | 2/2009 | Zhang et al. | 382/103 |

FOREIGN PATENT DOCUMENTS

| | | |
|---|---|---|
| JP | 11-328364 | 11/1999 |
| JP | 2001-006096 | 1/2001 |
| JP | 2007-065924 | 3/2007 |

* cited by examiner

ously the width in the

VEHICLE SURROUNDINGS MONITORING APPARATUS

BACKGROUND OF THE INVENTION

1. Field of the Invention

The present invention relates to a vehicle surroundings monitoring apparatus which recognizes an object affecting the travel of a vehicle.

2. Related Background Art

Conventionally, as this type of vehicle surroundings monitoring apparatus, there has been suggested a display processor which extracts an object such as a pedestrian likely to collide with a vehicle from an image of vehicle surroundings taken by an infrared camera and visually provides a vehicle driver with the information (for example, refer to Japanese Patent Laid-Open No. Hei 11(1999)-328364).

This apparatus searches for a high-luminance area by binarizing an infrared image and determines whether the high-luminance area represents a pedestrian's head from head determination conditions such as a centroid position, an area ratio, and a net area of the high-luminance area in the infrared image. After determining the area of the pedestrian's head, the apparatus then sets an area including a pedestrian's body and displays these areas separately from other areas. Thereby, the position of the entire pedestrian's body in the infrared image is identified and the information is displayed to the vehicle driver for visual aid.

For example, when binarization is made for an infrared image of a tree existing around the vehicle, however, the height (the length in the vertical direction) of the high-luminance area may be almost the same as the pedestrian's height in some cases under the influence of leaves of the tree. Therefore, the tree may satisfy the above head determination conditions of the centroid position, the area ratio, and the net area in the infrared image and be incorrectly determined to be a pedestrian.

As described above, the conventional vehicle surroundings monitoring apparatus often cannot correctly distinguish and determine the object type.

In view of the above problem, it is an object of the present invention to provide a vehicle surroundings monitoring apparatus capable of distinguishing and determining the object type with high reliability, particularly a vehicle surroundings monitoring apparatus capable of determining an object by distinguishing between a pedestrian and other objects among objects.

SUMMARY OF THE INVENTION

The present inventor has focused on vertical widths of an object and has found that the widths of the object show characteristic changes in the vertical direction of the object according to an object type. For example, if the object is a person, generally the width in the middle height position of the object is larger then the width in the upper height position of the object and the width in the lower height position is smaller than the width in the middle height position. On the other hand, if the object is a tree, generally there is no change in width in the upper height position, in the middle height position, and in the lower height position, or the width increases in the direction from the upper height position to the lower height position.

Therefore, according to one aspect of the present invention, there is provided a vehicle surroundings monitoring apparatus which monitors surrounding of a vehicle based on an image taken by a camera mounted on the vehicle, comprising: an object extraction process unit which extracts an object from the image; a width calculation process unit which calculates widths of the object extracted by the object extraction process unit in a plurality of height positions spaced at vertical intervals of the object; and an object type determination process unit which determines the type of the object based on the widths calculated by the width calculation process unit.

According to the vehicle surroundings monitoring apparatus of the present invention, the widths of the object are calculated in the plurality of height positions spaced at vertical intervals of the object extracted from the image by the object extraction process unit, and the type of the object is determined based on the calculated widths of the object in the plurality of height positions. In this situation, the widths in the plurality of height positions are characteristic according to the type of the object. Therefore, the vehicle surroundings monitoring apparatus of the present invention can determine the type of the object with high reliability by determining the type of the object based on the characteristic of the widths in the plurality of height positions.

Furthermore, in the vehicle surroundings monitoring apparatus of the present invention, the width calculation process unit calculates the width of a high-luminance portion whose luminance value in each of the height positions is equal to or higher than a predetermined value in the image of the object, as the width of the object in the height position.

According to the vehicle surroundings monitoring apparatus of the present invention, the widths of the object in the plurality of height positions calculated by the width calculation process unit are calculated as widths of high-luminance portions whose luminance values in the height positions are each equal to or higher than a predetermined value. It should be noted here that the predetermined value for the luminance value in each height position can be, for example, an average of luminance values in the height position or any other value relatively determined based on the intensity distribution of the luminance values. Thereby, it becomes possible to determine the predetermined value according to the luminance distribution of the height position to detect the width of the high-luminance portion whose luminance value is equal to or higher than the predetermined value as the width of the object based on the predetermined value. Therefore, the width of the object can be calculated easily with certain reliability.

Alternatively, in the vehicle surroundings monitoring apparatus of the present invention, the width calculation process unit detects a pair of vertical edges of the object in each of the height positions in the image of the object and calculates a width between the vertical edges as the width of the object in the height position.

According to the vehicle surroundings monitoring apparatus of the present invention, the widths of the object in the plurality of height positions calculated by the width calculation process unit are each calculated as the width between the vertical edges of the object in each height position. Thereby, for example, even if the object is detected as a low-luminance portion whose luminance value is lower than the predetermined value in one of the height positions, the width of the object in each width calculation position can be accurately calculated.

Furthermore, in the vehicle surroundings monitoring apparatus of the present invention, the object type determination process unit determines the type of the object by distinguishing between a pedestrian and other objects, and the object is determined to be other than a pedestrian in the case where the widths in the height positions calculated by the width calculation process unit increase with lowering height position or if the widths in the height positions are approximately the same as each other.

According to the vehicle surroundings monitoring apparatus of the present invention, if the widths in the vertical height positions of the object calculated by the width calculation process unit increase with lowering height position or if the widths in the height positions are approximately the same as each other, the object is determined to be other than a pedestrian. Note here that the term such that "if the widths in the height positions are approximately the same as each other" means "if the difference between the widths in the height positions is within a predetermined range and the width is considered to be substantially the same as in any height position. If the widths in the vertical height positions of the object increase with lowering height position or if the widths in the height positions are approximately the same as each other (for example, a tree or a utility pole existing around the vehicle), the object is determined to be other than a pedestrian. Thereby, it is possible to determine an object by distinguishing between a pedestrian and other objects among the objects extracted from the image with high reliability.

Furthermore, in the vehicle surroundings monitoring apparatus of the present invention, the plurality of height positions include at least three height positions in the upper part, center part, and lower part of the object, and the object type determination process unit, which determines the type of the object by distinguishing between a pedestrian and other objects, determines the object to be a pedestrian in the case where the width in the center height position of the object is larger than the width in the upper height position and the width in the lower height position among the widths calculated by the width calculation process unit.

According to the vehicle surroundings monitoring apparatus of the present invention, in the case where the widths of the object in the plurality of height positions include at least three positions in the upper part, center part, and lower part of the object, the object is considered to have a characteristic of a pedestrian if the width in the center height position of the object is larger than the width in the upper height position and the width in the lower height position, and is determined to be a pedestrian. Thereby, it is possible to determine the object by distinguishing the pedestrian from other objects among the objects extracted from the image with high reliability.

Furthermore, in the vehicle surroundings monitoring apparatus of the present invention, the object type determination process unit determines an object to be other than a pedestrian unless a requirement for determining the object to be a pedestrian is satisfied assuming the requirement is that the width in the center height position of the object is larger than the width in the upper height position and the width in the lower height position among the widths calculated by the width calculation process unit.

According to the vehicle surroundings monitoring apparatus of the present invention, it is determined whether the object is other than a pedestrian assuming the requirement for determining the object to be a pedestrian is that the width in the center height position of the object is larger than the width in the upper height position and the width in the lower height position among the widths of the objects in the plurality of height positions. The object not satisfying the requirement is considered to be other than a pedestrian, by which it is possible to determine the object by distinguishing between the pedestrian and other objects among the objects extracted from the image with high reliability.

Moreover, the vehicle surroundings monitoring apparatus of the present invention further includes a warning process unit which determines warning targets out of the objects extracted by the object extraction process unit and outputs warnings on the warning targets for a driver of the vehicle and, the warning process unit omits the object from the warning targets if the object type determination process unit determines the object to be other than a pedestrian.

According to the invention, if the vehicle surroundings monitoring apparatus includes the warning process unit and the object type determination process unit determines the object extracted from the image to be other than a pedestrian, the object is omitted from the warning targets of the warning process unit. Thereby, the warning process unit can inhibit unnecessary warning output if the object is other than a pedestrian.

According to another aspect of the present invention, there is provided a vehicle surroundings monitoring apparatus which has a computer including an interface circuit for accessing an image obtained by a camera mounted on a vehicle and detects a material body existing around the vehicle by the computer, wherein the computer performs: an object extraction process for extracting an object from the image; a width calculation process for calculating widths of the object in a plurality of height positions spaced at vertical intervals of the object extracted in the object extraction process; and an object type determination process for determining the type of the object based on the widths calculated in the width calculation process.

According to the vehicle surroundings monitoring apparatus of the present invention, the computer performs the width calculation process for the object extracted from the image by performing the object extraction process to thereby calculate the widths of the object in the plurality of vertical height positions of the object. Thereafter, the computer performs the object type determination process to thereby determine the type of the object based on the calculated widths of the object in the plurality of height positions. The widths in the plurality of height positions are characteristic according to the object type in this situation. Therefore, the object type can be determined with high reliability by determining the object type based on the characteristic of the widths in the plurality of height positions.

According to still another aspect of the present invention, there is provided a vehicle surroundings monitoring method for detecting a material body existing around a vehicle by a computer including an interface circuit for accessing an image obtained by a camera mounted on the vehicle, comprising: an object extraction step in which the computer extracts an object from the image; a width calculation step in which the computer calculates widths of the object in a plurality of height positions spaced at vertical intervals of the object extracted in the object extraction step; and an object type determination step in which the computer determines the type of the object based on the widths calculated in the width calculation step.

According to the vehicle surroundings monitoring method of the present invention, the computer performs the object extraction step and the width calculation step to extract the object from the image and to calculate the widths of the object in the plurality of vertical height positions of the extracted object. Thereafter, the computer performs the object type determination step to thereby determine the type of the object based on the calculated widths of the object in the plurality of height positions. The widths in the plurality of height positions are characteristic according to the object type in this situation. Therefore, the object type can be determined with high reliability by determining the object type based on the characteristic of the widths in the plurality of height positions.

Subsequently, according to still another aspect of the present invention, there is provided a vehicle surroundings monitoring program for detecting a material body existing around a vehicle by a computer including an interface circuit for accessing an image obtained by a camera mounted on the vehicle, the program causing the computer to perform: an object extraction process for extracting an object from the image; a width calculation process for calculating widths of the object in a plurality of height positions spaced at vertical intervals of the object extracted in the object extraction process; and an object type determination process for determining the type of the object based on the widths calculated in the width calculation process.

The vehicle surroundings monitoring program of the present invention is executed by the computer, thereby enabling the configuration of the object extraction process unit, the width calculation process unit, and the object type determination process unit in the vehicle surroundings monitoring apparatus of the present invention described above.

DETAILED DESCRIPTION OF THE PREFERRED EMBODIMENTS

One preferred embodiment of the present invention will now be described hereinafter with reference to FIG. 1 to FIG. 7.

Figure 1:
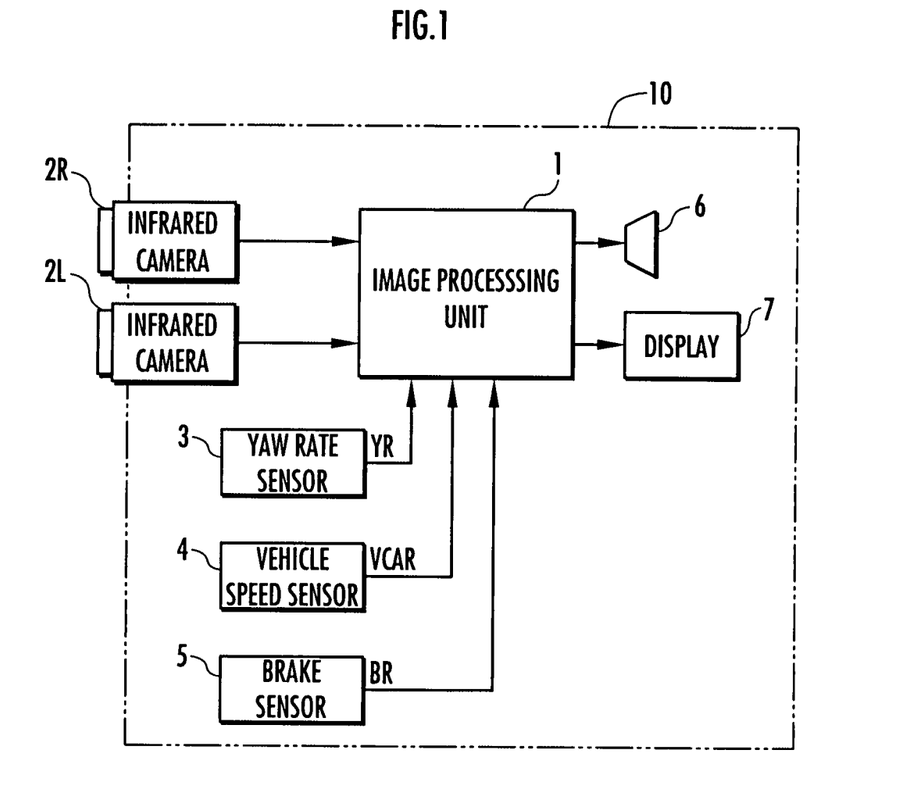
FIG. 1 is a diagram showing an overall configuration of one embodiment of a vehicle surroundings monitoring apparatus according to the present invention.
Figure 2:
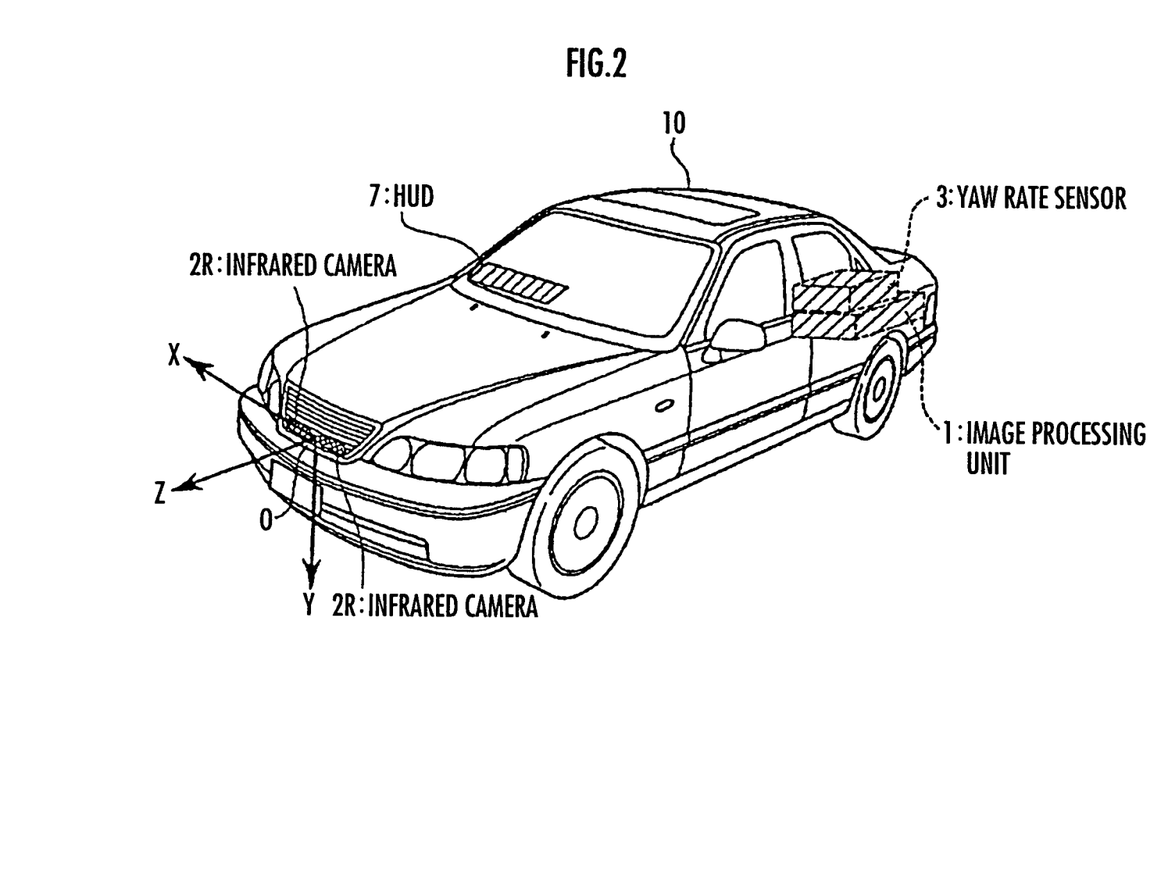
FIG. 2 is a perspective diagram of a vehicle having the vehicle surroundings monitoring apparatus shown in FIG. 1.

First, a system configuration of a vehicle surroundings monitoring apparatus according to this embodiment will be described with reference to FIG. 1 and FIG. 2. FIG. 1 is a block diagram showing the overall configuration of the vehicle surroundings monitoring apparatus and FIG. 2 is a perspective diagram showing the appearance of a vehicle (subject vehicle) equipped with the vehicle surroundings monitoring apparatus. Note that, however, a part of the components of the vehicle surroundings monitoring apparatus are not shown in FIG. 2.

Referring to FIG. 1 and FIG. 2, the vehicle surroundings monitoring apparatus according to this embodiment includes an image processing unit 1. The image processing unit 1 is connected to two infrared cameras 2R and 2L as cameras which take images of a view ahead of the vehicle 10 and further connected to a yaw rate sensor 3 which detects a yaw rate of the vehicle 10 as a sensor which detects a running condition of the vehicle 10, a vehicle speed sensor 4 which detects a traveling speed (vehicle speed) of the vehicle 10, and a brake sensor 5 which detects a brake operation (more specifically, whether a brake pedal is operated) of the vehicle 10.

Furthermore, the image processing unit 1 is connected to a loudspeaker 6 for use in outputting audible warning information with voice or the like and to a display 7 for use in displaying the images taken by the infrared cameras 2R and 2L or visual warning information.

The image processing unit 1 is an electronic circuit including an A/D converter, a microcomputer (CPU, RAM, or ROM), and an image memory, though its detailed illustration is omitted. Outputs (analog signals) of the infrared cameras 2R and 2L, the yaw rate sensor 3, the vehicle speed sensor 4, and the brake sensor 5 are digitized and input via the A/D converter. Then, the image processing unit 1 performs a process of detecting an object such as a person (pedestrian) based on the input data or a process of determining whether a predetermined warning requirement is satisfied with respect to the detected object and issuing a warning for a driver via the loudspeaker 6 or the display 7 if the warning requirement is satisfied by using the microcomputer.

The image processing unit 1 has functions of an object extraction process unit, a width calculation process unit, an object type determination process unit, and a warning process unit according to the present invention.

As shown in FIG. 2, the infrared cameras 2R and 2L are attached to the front (the front grille in this figure) of the vehicle 10 in order to take images of a view ahead of the vehicle 10. In this instance, the infrared cameras 2R and 2L are arranged in the right of the center of the vehicle 10 in the vehicle width direction and in the left thereof, respectively. These positions are symmetrical about the center of the vehicle 10 in the vehicle width direction. Moreover, the infrared cameras 2R and 2L are fixed to the front of the vehicle 10 in such a way that their optical axes are extending in the anteroposterior direction of the vehicle 10 in parallel with each other and the heights of the optical axes from the road surface are equal to each other. The infrared cameras 2R and 2L have sensitivity in the far-infrared region and thereby have a characteristic that the higher the temperature of an imaged material body is, the higher the level of the output signal of the image is (the higher the luminance of the image of the material body is).

Furthermore, the display 7 has a head up display 7a (hereinafter, referred to as HUD 7a) which displays information such as an image on a front window of the vehicle 10 in this embodiment. The display 7 can include a display provided integrally with a meter which indicates a vehicle speed or other running conditions of the vehicle 10 or a display provided in an in-vehicle navigation system, instead of the HUD 7a or together with the HUD 7a.

Furthermore, the image processing unit 1 is an electronic unit including an image input circuit, which converts analog image signals output from the infrared cameras 2R and 2L to digital data and captures the digital data into an image memory, and a computer (an arithmetic processing circuit including a CPU, a memory, I/O circuits and the like or a microcomputer in which these functions are collected intensively), which performs various arithmetic processing operations for the images of a view ahead of the vehicle captured into the image memory, having an interface circuit for accessing (reading or writing) image data captured into the image memory.

Figure 3:
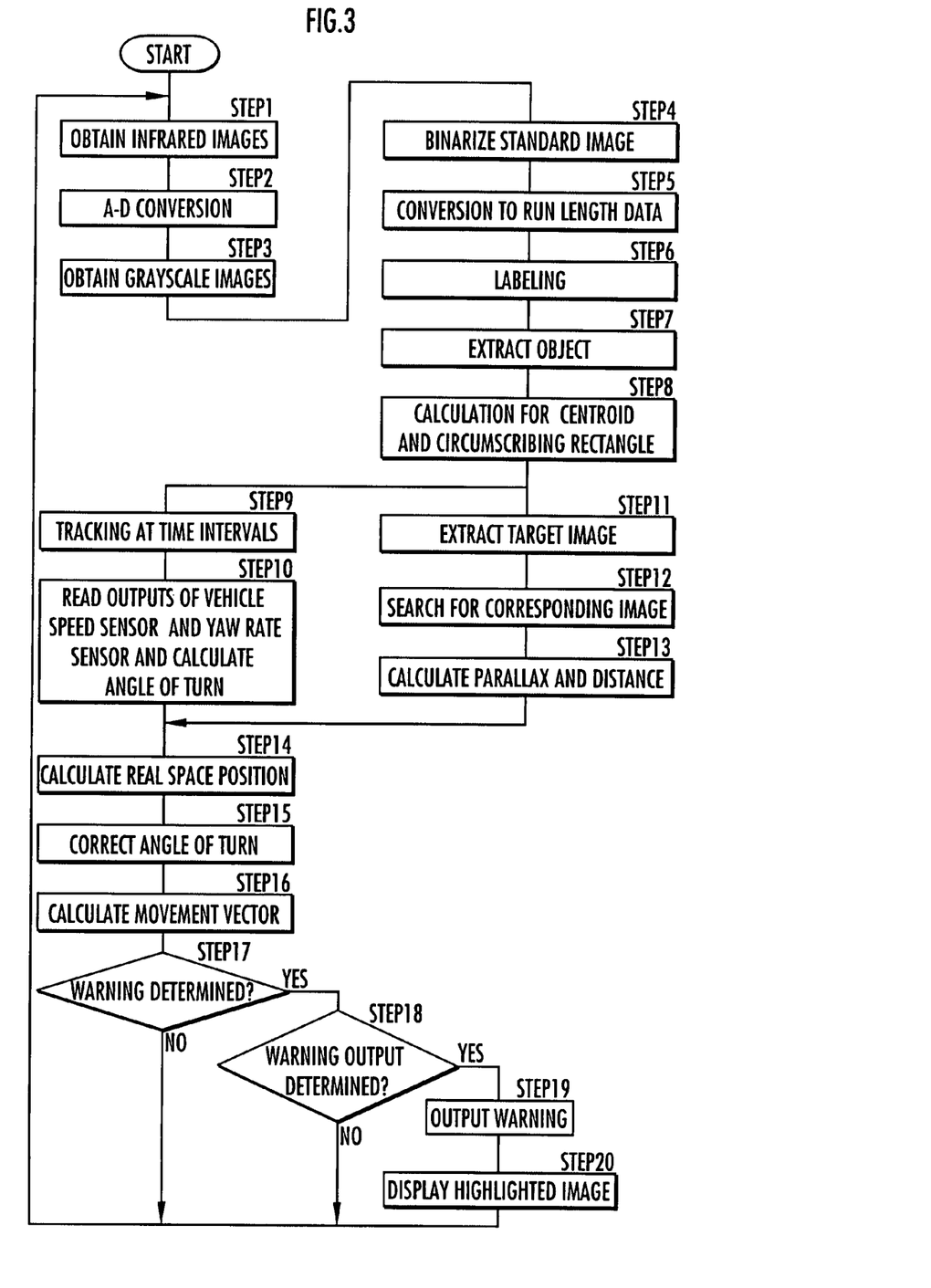
FIG. 3 is a flowchart showing processing of an image processing unit provided in the vehicle surroundings monitoring apparatus shown in FIG. 1.
Figure 4:
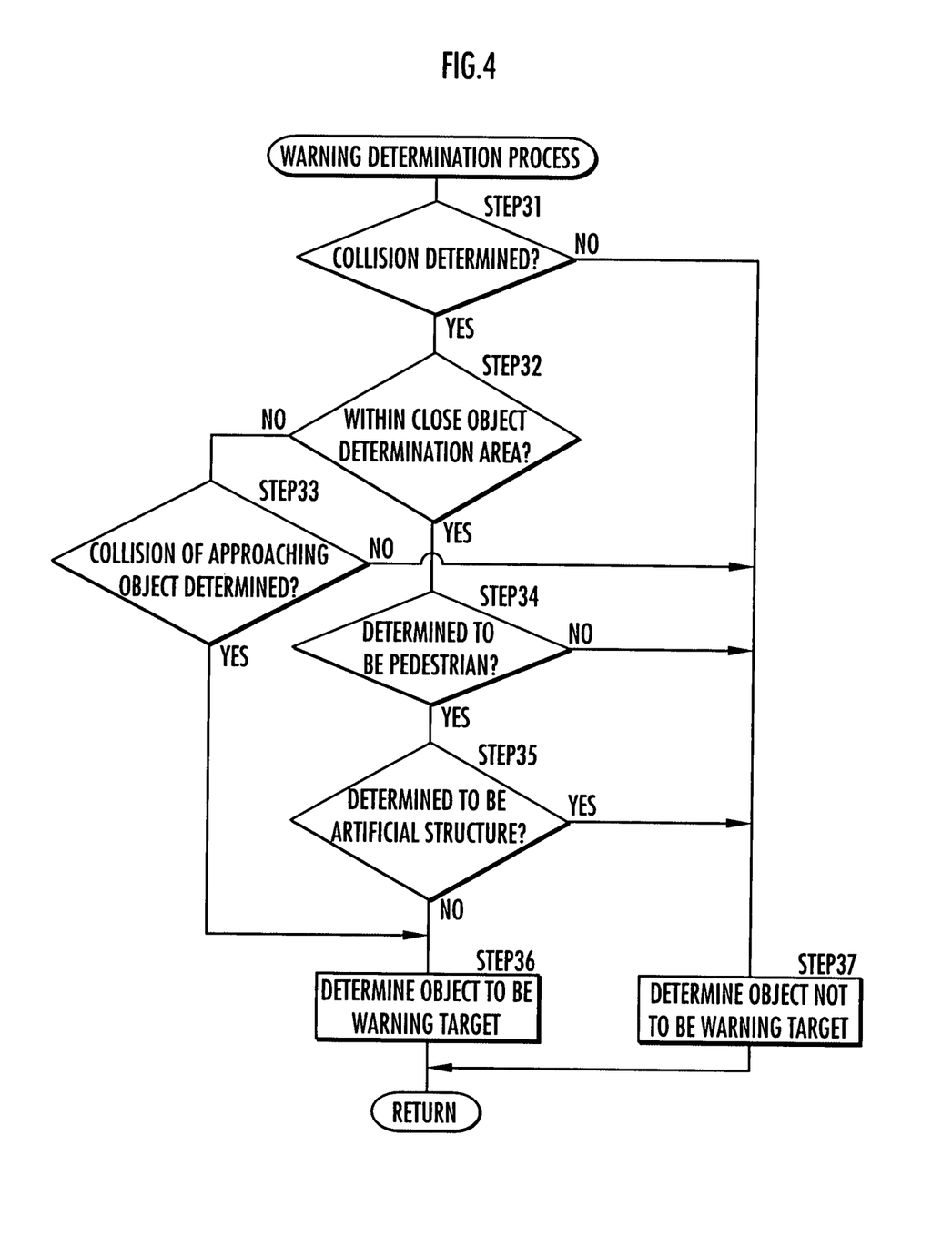
FIG. 4 is a flowchart showing processing of the image processing unit provided in the vehicle surroundings monitoring apparatus shown in FIG. 1.

Subsequently, the general operation of the vehicle surroundings monitoring apparatus according to this embodiment will be described with reference to flowcharts shown in FIG. 3 and FIG. 4. Since substantial processing of the flowcharts in FIG. 3 and FIG. 4 is the same as, for example, the processing shown in FIG. 3 and FIG. 4 disclosed in Japanese Patent Laid-Open No. 2001-6096 to the present applicant, the detailed description of the same processing will be omitted in this specification.

First, the image processing unit 1 obtains infrared images, which are output signals of the infrared cameras 2R and 2L (step 1), A-D converts them (step 2), and stores the images into the image memory (step 3). Thereby, the images taken by the infrared cameras 2R and 2L are captured into the image processing unit 1. Hereinafter, the image taken by the infrared camera 2R is referred to as right image and the image taken by the infrared camera 2L is referred to as left image. Both of the right and left images are grayscale images.

Subsequently, the image processing unit 1 considers one of the right and left images as a standard image and binarizes the standard image (step 4). The standard image is the right image in this embodiment. In this binarization, a luminance value of each pixel of the standard image is compared with a predetermined luminance threshold value and a value of "1" (white) is set if the luminance value of an area is equal to or higher than the predetermined luminance threshold value (relatively bright area) and a value of "0" (black) is set if the luminance value of an area is lower than the predetermined luminance threshold value (relatively dark area). Hereinafter, the image (monochrome image) obtained by the binarization is referred to as binary image. In addition, the area set to "1" in the binary image is referred to as high-luminance area. The binary image is stored in the image memory besides the grayscale images (the right image and the left image).

Subsequently, the image processing unit 1 performs the processing of steps 5 to 7 for the binary image to extract an object (more accurately, an image portion corresponding to the object) from the binary image. More specifically, the image processing unit 1 divides pixels constituting the high-luminance area of the binary image into lines extending in the horizontal direction (x direction) having a width of one pixel in the vertical direction (y direction) of the standard image and converts each line to run length data made of the coordinates and length (pixel count) of the position (the two-dimensional position in the standard image) (step 5). Thereafter, each of the lines overlapping in the vertical direction of the standard image among the lines represented by the run length data is labeled (with an identifier) (step 6) and each of the lines is extracted as an object (step 7).

The objects extracted in the processing of steps 5 to 7 generally include artificial structures such as other vehicles as well as a person (pedestrian). In addition, a plurality of local portions of an identical material body may be extracted as an object in some cases.

Subsequently, the image processing unit 1 calculates a centroid position (a position in the standard image) and area of each object extracted as described above and the aspect ratio of a rectangle circumscribing the object (step 8). The centroid position of each object is obtained by multiplying the coordinates of the position of each line (the center position of each line) of the run length data included in the object by the length of the line, adding up the results of all lines of the run length data included in the object, and dividing the result of addition by the area of the object. Alternatively, the centroid (center) position of the rectangle circumscribing the object can be obtained instead of the centroid position of the object.

Subsequently, the image processing unit 1 tracks the object extracted in step 7 at time intervals, in other words, recognizes an identical object for each arithmetic processing period of the image processing unit 1 (step 9). In this processing, assuming that an object A is extracted in the process of step 7 at time (discrete time) k in a certain arithmetic processing period and an object B is extracted in the process of step 7 at time k+1 in the next arithmetic processing period, the identity between the objects A and B is determined. The identity can be determined, for example, based on the shapes and sizes of the objects A and B in the binary image, the correlation of the luminance distribution in the standard image (grayscale image), or the like. Thereafter, if the objects A and B are determined to be identical to each other, the label (the label appended in step 6) of the object B extracted at time k+1 is changed to the same label as the object A.

The processing in steps 1 to 9, which corresponds to an object extraction step of a vehicle surroundings monitoring method according to the present invention, is performed by an object extraction process unit which is configured by causing the computer provided in the image processing unit 1 to execute a vehicle surroundings monitoring program according to the present invention.

Subsequently, the image processing unit 1 reads an output of the vehicle speed sensor 4 and that of the yaw rate sensor 3 (a detected value of the vehicle speed and a detected value of the yaw rate) (step 10). In this step 10, an angle of turn (azimuth) of the vehicle 10 is also calculated by integrating the detected value of the yaw rate that has been read.

On the other hand, the image processing unit 1 performs steps 11 to 13 in parallel with the processing of steps 9 and 10. The processing of steps 11 to 13 is performed to obtain a distance from the vehicle 10 to each object extracted in step 7. Schematically describing the processing, first, the area corresponding to each object (for example, the area of the rectangle circumscribing the object) is extracted as a target image R1 from the right image (the standard image) (step 11).

Subsequently, a search area R2, which is an area to be searched for the identical object to the object included in the target image R1 in the right image, is set in the left image. Then, an area having the highest correlation with the target image R1 in the search area R2 is extracted as a corresponding image R3, which is an image corresponding to the target image R1 (an image equivalent to the target image R1) (step 12). In this instance, an area having a luminance distribution most consistent with the luminance distribution of the target image R1 in the right image within the search area R2 of the left image is extracted as the corresponding image R3. The processing of step 12 is performed by using a grayscale image, instead of the binary image.

Subsequently, the pixel count of a difference between the horizontal position (x-direction position) of the centroid of the target image R1 in the right image and the horizontal position (x-direction position) of the centroid of the corresponding image R3 in the left image is calculated as parallax $\Delta d$, and a distance z from the vehicle 10 to the object (a distance in the anteroposterior direction of the vehicle 10) is calculated by using the parallax $\Delta d$ (step 13). The distance z is calculated by the following equation (1):

$$z=(f \times D)/(\Delta d \times p) \quad (1)$$

where f is the focal length of the infrared cameras 2R and 2L, D is the base length of the infrared cameras 2R and 2L (a distance between the optical axes), and p is a pixel pitch (the length of one pixel).

The above is the outline of the processing of steps 11 to 13. The processing of steps 11 to 13 is performed for each object extracted in step 7.

After the completion of the processing of steps 10 and 13, the image processing unit 1 then calculates a real space position, which is a position in real space of each object (a relative position with respect to the vehicle 10) (step 14). It should be noted here that the real space position is a position (X, Y, Z) in the real space coordinate system (XYZ coordinate system) set with the origin at the midpoint of the mounting locations of the infrared cameras 2R and 2L as shown in FIG. 2. The X direction and the Y direction of the real space coordinate system correspond to the vehicle width direction and the vertical direction of the vehicle 10, respectively, and the X direction and the Y direction are the same as the x direction (horizontal direction) and the y direction (vertical direction) of the right and left images, respectively. Furthermore, the Z direction of the real space coordinate system corresponds to the anteroposterior direction of the vehicle 10. The real space positions (X, Y, Z) of the object are calculated by the following equations (2), (3), and (4):

$$X = x \times z \times p/f \quad (2)$$

$$Y = y \times z \times p/f \quad (3)$$

$$Z = z \quad (4)$$

where x and y are an x coordinate and a y coordinate in the standard image, respectively.

Subsequently, the image processing unit 1 compensates for changes in the angle of turn of the vehicle 10 by correcting it according to the time series data of the angle of turn obtained in step 10 from the value of the position X in the X direction of the real space position (X, Y, Z) of the object obtained by the above equation (2) in order to increase the accuracy of the real space position of the object (step 15). Thereby, the real space position of the object is finally achieved. In the following description, the term "real space position of the object" means the real space position of the object that has been corrected as described above.

Subsequently, the image processing unit 1 calculates a movement vector of the object relative to the vehicle 10 (step 16). More specifically, the image processing unit 1 finds a straight line approximating the time series data in a predetermined period (a period from the current time to the time previous to a predetermined time) in the real space position of the identical object and calculates a vector from the position (point) of the object on the straight line at the time previous to the predetermined time toward the position (point) of the object on the straight line at the current time as the movement vector of the object. This movement vector is in proportion to a relative velocity vector of the object to the vehicle 10.

Subsequently, after calculating the relative movement vector in step 16, the image processing unit 1 performs a warning determination process for determining the possibility of collision with the detected object (step 17). The details of the warning determination process will be described later.

If the image processing unit 1 determines that no object satisfies the warning requirement (there is no object corresponding to the warning requirement) in the warning determination process in step 17 (if the determination result of step 17 is NO), it restarts the processing from step 1. If the image processing unit 1 determines that one of the objects satisfies the warning requirement in step 17 (if the determination result of step 17 is YES), it proceeds to step 18 to perform a warning output determination process for determining whether to output an actual warning on the object satisfying the warning requirement (step 18). In this warning output determination process, the image processing unit 1 checks that the driver is carrying out a brake operation of the vehicle 10 on the basis of an output of the brake sensor 5 and determines that the warning should not be output if the deceleration (positive in the decelerating direction of the vehicle speed) of the vehicle 10 is larger than a predetermined threshold value (>0). Unless the driver is carrying out the brake operation or if the deceleration of the vehicle 10 is equal to or lower than the predetermined threshold value even if the driver is carrying out the brake operation, the image processing unit 1 determines that the warning should be output.

If the image processing unit 1 determines that the warning should be output (if the determination result of step 18 is YES), it generates a voice alarm through the loudspeaker 6 (step 19) and displays a highlighted image of the object satisfying the warning requirement in the standard image of the display 7 (step 20). This draws the driver's attention to the object. It is also possible to use only one of the loudspeaker 6 and the display 7 for the warning to the driver.

If the image processing unit 1 determines that no warning should be output (if no warning should be output regarding all objects) in step 18, the determination result of step 18 is NO and processing from step 1 is directly restarted.

The above is the general operation of the vehicle surroundings monitoring apparatus according to this embodiment.

Subsequently, the warning determination process in step 17 of the flowchart shown in FIG. 3 will be described in more detail with reference to the flowchart shown in FIG. 4.

Referring to FIG. 4, there is shown a flowchart of the warning determination process in this embodiment. The warning determination process is performed to determine the possibility of collision between the vehicle 10 and the detected object through a collision determination process, a determination process of whether the object is within a close object determination area, an approaching object collision determination process, a pedestrian determination process, and an artificial structure determination process described below.

First, the image processing unit 1 performs the collision determination process (step 31). The collision determination process is performed to determine whether there is the possibility of collision between the object and the vehicle 10 within the time to collision T (for example, 2 to 5 sec.) by calculating a relative speed Vs to the vehicle 10 in the Z direction from a distance that the object has moved closer to the vehicle 10 in a predetermined time period and assuming that the object and the vehicle 10 are moving with the relative speed Vs maintained. More specifically, if the distance between the vehicle 10 and the object is equal to or less than a value obtained by multiplying the relative speed Vs by the time to collision T, the image processing unit 1 determines that there is the possibility of collision.

Subsequently, if there is the possibility of collision between the vehicle 10 and the object within the time to collision T in step 31 (if the determination result of step 31 is YES), the image processing unit 1 performs a determination process of whether the object is within the close object determination area in order to further increase the reliability of the determination (step 32). The determination process of whether the object is within the close object determination area is performed to determine whether the object is within an area that can be monitored by the infrared cameras 2R and 2L and corresponds to a range having a width equal to the vehicle width of the vehicle 10 plus allowances (for example, 50 to 100 cm or so) on both sides of the vehicle, in other words, within the close object determination area where the object is very likely to collide with the vehicle 10 if the object remains to be there.

Furthermore, unless the object is within the close object determination area in step 32 (if the determination result of step 32 is NO), the image processing unit 1 performs the approaching object collision determination process for determining whether there is the possibility that the object enters the close object determination area and comes into collision with the vehicle 10 (step 33). In the approaching object collision determination process, an area having a larger absolute value of the X coordinate than the above-described close object determination area (area laterally outward of the close object determination area) within the area taken by the cameras is referred to as approaching object determination area. The approaching object collision determination process is performed to determine whether an object in this area enters the close object determination area by moving and comes into collision with the vehicle 10. More specifically, the image processing unit 1 determines that the object is at an increased risk for collision with the vehicle 10 when the movement vector (see step 16) of the object in the close object determination area is directed toward the vehicle 10.

On the other hand, if the object is within the close object determination area in step 32 (if the determination result of step 32 is YES), the image processing unit 1 performs a pedestrian determination process for determining whether there is a possibility that the object may be a pedestrian (step 34). The pedestrian determination process is performed to determine whether the object is a pedestrian from a shape, size, luminance distribution, or the like of the object image in the grayscale image. It should be noted that a tree may be determined to be a pedestrian in some cases when the object is the tree in the pedestrian determination process.

Subsequently, if the image processing unit 1 determines that the object may be a pedestrian in step 34 (if the determination result of step 34 is YES), it performs the artificial structure determination process for determining whether the object is an artificial structure in order to increase the reliability of the determination (step 35). The artificial structure determination process is performed to determine the object to be an artificial structure if a characteristic impossible for a pedestrian to acquire is detected in the image of the object determined to be likely to be a pedestrian in step 34 and to omit the object from the warning targets. The artificial structure determination process includes determining the object to be an artificial structure if a characteristic impossible for a pedestrian to acquire is detected in the object image as described in the following conditions (a) to (e) and omitting the object from the warning targets. While the details will be described later, the condition (e) of the following (a) to (e) relates to the present invention.

(a) The object image includes a portion representing a straight edge.
(b) The object image includes a right angle.
(c) The object image includes a plurality of the same shapes.
(d) The object image matches one of previously registered shapes of artificial structures.
(e) The object image includes widths in a plurality of height positions having a predetermined relation.

Therefore, if there is the possibility that the object enters the close object determination area and comes into collision with the vehicle 10 in the above step 33 (if the determination result of step 33 is YES) or if the object determined to be likely to be a pedestrian is not an artificial structure in step 35 (if the determination result of step 35 is NO), the image processing unit 1 determines the detected object to be a warning target (step 36) and proceeds to step 18 assuming that the determination result of step 17 shown in FIG. 3 is YES to perform the warning output determination process (step 18).

On the other hand, if there is no possibility of collision between the vehicle 10 and the object within the time to collision T in the above step 31 (if the determination result of step 31 is NO), if there is no possibility that the object enters the close object determination area and comes into collision with the vehicle 10 in step 33 (if the determination result of step 33 is NO), if there is no possibility that the object is a pedestrian in step 34 (if the determination result of step 34 is NO), or if the object determined to be likely to be a pedestrian is an artificial structure in step 35 (if the determination result of step 35 is YES), the image processing unit 1 determines the detected object not to be a warning target (step 37) and returns to step 1 assuming that the determination result of step 17 shown in FIG. 3 is NO to repeat the object detection and warning operation for a pedestrian or the like.

The processing of step 17 to step 20 is performed by a warning process unit configured by causing the computer provided in the image processing unit 1 to execute a vehicle surroundings monitoring program.

Figure 5:
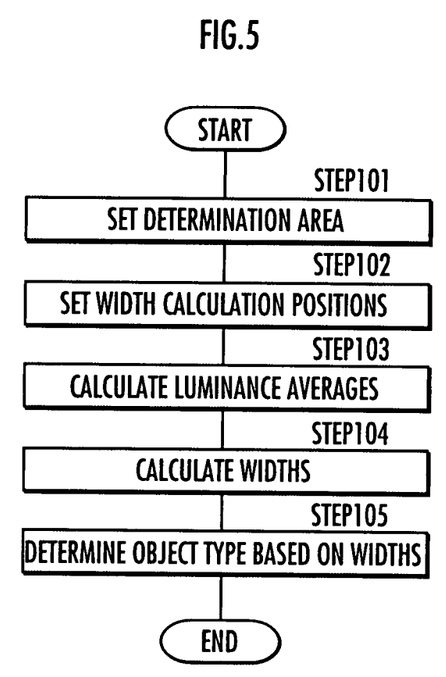
FIG. 5 is a flowchart showing an object type determination process in this embodiment.

Subsequently, the processing for the above condition (e) relating to the present invention will be described with reference to the flowchart shown in FIG. 5.

First, the image processing unit 1 sets a determination area ARE including objects having the same distance or formed by a rectangle circumscribing the object parts in the standard image (grayscale image) for the objects extracted as objects (step 101). More specifically, a calculation is made for each of the objects having the same distance from the vehicle 10 or for the object parts and the determination ARE is set in such a way as to include the parts having the same distance.

Figure 6A:
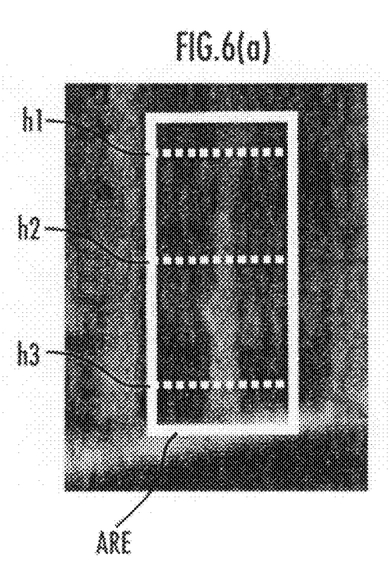
FIG. 6 is a diagram illustrating taken images in this embodiment.
Figure 6B:
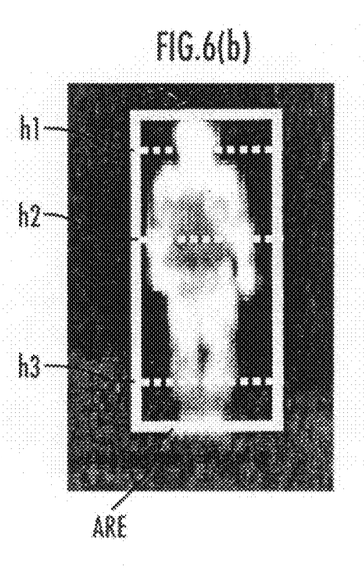

For example, if the standard image (grayscale image) includes a tree trunk as an object, the determination area ARE is set in such a way as to include the trunk parts having the same distance in the tree as shown in FIG. 6(a). If the standard image (grayscale image) includes a pedestrian as an object, the determination area ARE is set in such a way as to include the entire pedestrian as parts having the same distance as shown in FIG. 6(b). Note that the upper part of the tree is considered to be invisible in FIG. 6(a), because only the trunk parts of the tree are imaged as relatively high-luminance portions due to the effect of the leaves of the tree. In this embodiment, the height of the tree trunk is equivalent to the general height of a pedestrian.

Subsequently, the image processing unit 1 sets a plurality of height positions vertically spaced at predetermined intervals in the determination area ARE as width calculation positions h1, h2, and h3 in the standard image (grayscale image) (step 102). The width calculation positions h1, h2, and h3 are set to positions spaced at distances from the upper end or lower end of the determination area ARE having predetermined proportions with respect to the vertical full length of the determination area ARE. In other words, if the object included in the determination area ARE is a pedestrian, the width calculation positions h1, h2, and h3 are set to the positions substantially corresponding to the head, waist, and legs of the pedestrian as those having the predetermined proportions.

More specifically, if the object included in the determination area ARE is a pedestrian, the upper width calculation position h1, the center width calculation position h2, and the lower width calculation position h3 are set to the positions where the head, waist, and legs of the pedestrian are estimated to be present for the determination area ARE shown in FIG. 6(a) or FIG. 6(b).

Since the width calculation positions h1, h2, and h3 are set to the positions having the predetermined proportions with respect to the vertical full length of the determination area ARE as described above in this situation, they can be set to the positions where the head, waist and legs of the pedestrian are estimated to be present independently of the distance between the vehicle 10 and the object.

In other words, if the distance between the object included in the determination area ARE and the vehicle 10 is small (if the object is coming close to the vehicle 10), the object image and the determination area ARE are larger than if the distance between the object included in the determination area and the vehicle 10 is large (if the object is not coming close to the vehicle 10), but again, if the object included in the determination area ARE is a pedestrian in this situation, the upper width calculation position h1, the center width calculation position h2, and the lower width calculation position h3 are set to the positions where the head, waist, and legs of the pedestrian are estimated to be present. On the other hand, if the distance between the object included in each determination area ARE and the vehicle 10 is large (if the object is not coming close to the vehicle 10), the object image and the determination area ARE are smaller than if the distance between the object included in the determination area ARE and the vehicle 10 is small (if the object is coming close to the vehicle 10), but again, if the object included in the determination area ARE is a pedestrian in this situation, the upper width calculation position h1, the center width calculation position h2, and the lower width calculation position h3 are set to the positions where the head, waist, and legs of the pedestrian are estimated to be present.

While the determination area ARE including the objects having the same distance from the vehicle 10 or the object parts are set (step 101) and then the width calculation positions h1, h2, and h3 are set to the positions having the predetermined proportions with respect to the vertical full length of the determination area ARE (step 102) in this embodiment, it is also possible to set the width calculation positions to height positions spaced at predetermined distances from the bottom edge of the object according to the distance between the vehicle 10 and the object.

While the upper width calculation position h1, the center width calculation position h2, and the lower width calculation position h3 are set as three width calculation positions in this embodiment, four or more width calculation positions can be set only if they include at least the above three positions.

Thereafter, the image processing unit 1 calculates luminance averages av1, av2, and av3 in the upper width calculation position h1, the center width calculation position h2, and the lower width calculation position h3 in the standard image (grayscale image) (step 103). Note here that the standard image is a far-infrared image and therefore the luminance averages av1, av2, and av3 in the width calculation positions h1, h2, and h3 depend upon the temperatures (average temperatures) of the object existing in the width calculation positions h1, h2, and h3. Accordingly, the luminance average increases as the temperature rises.

Subsequently, the image processing unit 1 defines the luminance averages av1, av2, and av3 in the above width calculation positions h1, h2, and h3 as predetermined values and calculates the widths H, B, and L of higher luminance portions than the predetermined values in the standard image (grayscale image) as the widths of the object (step 104). It should be noted here that the luminance averages av1, av2, and av3 depend upon the temperatures (average temperatures) of the object existing in the width calculation positions h1, h2, and h3 as described above and therefore, even in the case of variations in temperature of the object in the width calculation positions h1, h2, and h3, the image processing unit 1 can calculate the widths of the object in the width calculation positions h1, h2, and h3 as the widths of portions whose luminance values are equal to or higher than the luminance averages av1, av2, and av3 with certain reliability.

Figure 7A:
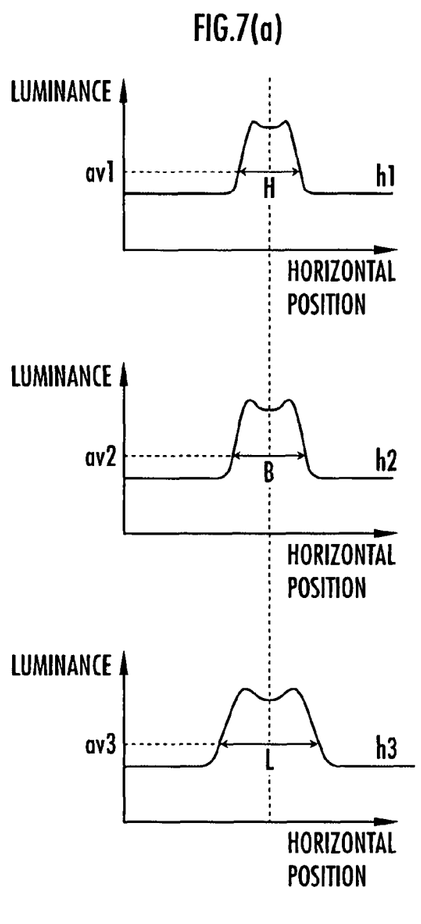
FIG. 7 is a diagram for explaining the processing of the image processing unit.
Figure 7B:
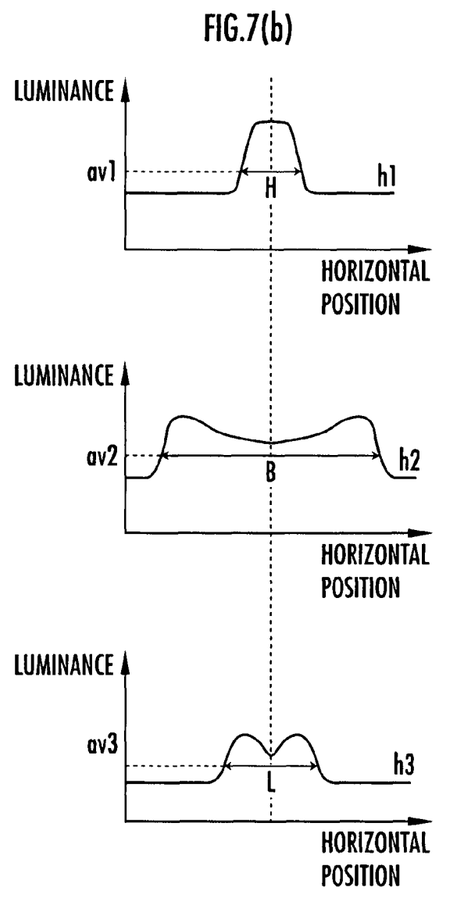

More specifically, if the images shown in FIG. 6(a) and FIG. 6(b) are obtained, the upper width H, the center width B, and the lower width L of the object in the upper width calculation position h1, the center width calculation position h2, and the lower width calculation position h3 are calculated as the widths of the high-luminance portions having luminance levels equal to or higher than the luminance averages av1, av2, and av3, respectively, as shown in FIG. 7(a) and FIG. 7(b).

While the luminance averages av1, av2, and av3 in the width calculation positions h1, h2, and h3 are used as the predetermined values in this embodiment, the predetermined values are not limited to them, but can be values relatively determined based on the intensity distribution of the luminance values.

Furthermore, the luminance averages are defined as the predetermined values and the widths of the higher luminance portions than the predetermined values are calculated as the widths of the object in this embodiment. For example, however, where the outdoor temperature is higher than the object temperature and the object is detected as lower luminance portions than the predetermined values, it is also possible to calculate the widths of the contiguous low-luminance portions as widths of the object.

Furthermore, while the widths of the object are calculated based on the luminance values as described above in this embodiment, it is also possible to detect a pair of vertical edges in the determination area ARE by using a differential filter or the like to calculate the width between the vertical edges in each of the width calculation positions h1, h2, and h3 as the width of the object in addition to or instead of the calculation in this embodiment. Thereby, for example, even if the outdoor temperature is higher than the object temperature and the object is detected as lower luminance portions than the predetermined values, the widths of the object in the width calculation positions h1, h2, and h3 can be accurately calculated.

Subsequently, the image processing unit 1 determines the object to be other than a pedestrian if the upper width H, the center width B, and the lower width L of the object calculated in the width calculation positions h1, h2, and h3 for each determination area ARE satisfy the following conditional expression (5) (step 105).

$$(H \leq B) \text{ and } (B \leq L) \tag{5}$$

More specifically, if the upper width H, the center width B, and the lower width L of the object calculated in the width calculation positions h1, h2, and h3 satisfy the above conditional expression (5), the object is very likely to be other than a pedestrian such as a tree or a utility pole existing around the vehicle 10 and therefore the image processing unit 1 determines the object to be other than a pedestrian. In other words, if the upper width H, the center width B, and the lower width L of the object calculated in the width calculation positions h1, h2, and h3 increase with lowering height position or if the widths in the respective height positions are the same as each other (if the above conditional expression (5) is satisfied), the object does not have a width characteristic of a pedestrian and is very likely to be other than a pedestrian. Therefore, the object is determined to be other than a pedestrian.

Instead of or in addition to the above conditional expression (5), the object can be determined to be other than a pedestrian unless a requirement for determining the object to be a pedestrian is satisfied assuming that the requirement is that the upper width H, the center width B, and the lower width L of the object calculated in the width calculation positions h1, h2, and h3 satisfy the following conditional expression (6):

$$(H < B) \text{ and } (B > L) \tag{6}$$

Specifically, where the upper width H, the center width B, and the lower width L of the object calculated in the width calculation positions h1, h2, and h3 satisfy the above conditional expression (6), the object has a vertical width characteristic of the object when the object is a pedestrian and thus is very likely to be a pedestrian. Therefore, unless a requirement for determining the object to be a pedestrian is satisfied assuming that the requirement is the above conditional expression (6), the object is determined to be other than a pedestrian. In other words, unless a requirement for determining the object to be a pedestrian is satisfied assuming that the requirement is that the center width B is larger than the upper width H and the lower width L among the upper width H, the center width B, and the lower width L of the object calculated in the width calculation positions h1, h2, and h3 (unless the above conditional expression is satisfied), the object is determined to be other than a pedestrian because the object is not considered to have the width characteristic of a pedestrian.

The processing of steps 101 to 104, which corresponds to a width calculation step of the vehicle surroundings monitoring method according to the present invention, is performed by a width calculation process unit which is configured by causing the computer provided in the image processing unit 1 to execute the vehicle surroundings monitoring program according to the present invention. Furthermore, the processing of step 105, which corresponds to an object type determination step of the vehicle surroundings monitoring method according to the present invention, is performed by an object type determination process unit configured by causing the computer provided in the image processing unit 1 to execute the vehicle surroundings monitoring program according to the present invention.

While the object has been determined to be other than a pedestrian unless the above conditional expression (6) is satisfied in step 35 in this embodiment, it is also possible to determine the object to be a pedestrian if the above conditional expression (6) is satisfied in step 34. In this case, the determination based on the conditional expression (6) can be omitted in step 35.

The details of the warning determination process in step 17 in this embodiment have been described hereinabove.

In the above warning determination process, for example, if the object is a tree as shown in FIG. 6(a), the upper width H, the center width B, and the lower width L of the object are calculated as shown in FIG. 7(a) for the width calculation positions h1, h2, and h3 in FIG. 6(a) and it is found that the upper width H, the center width B, and the lower width L are in a H<B<L relation and satisfy the conditional expression (5), by which the object is determined to be very likely to be other than a pedestrian and the object is omitted from the warning targets. This enables the warning process unit to prevent an output of unnecessary warning where the object is other than a pedestrian. On the other hand, if the object is a pedestrian as shown in FIG. 6(b), the upper width H, the center width B, and the lower width L of the object are calculated as shown in FIG. 7(b) for the width calculation positions h1, h2, and h3 in FIG. 6(b) and it is found that the upper width H, the center width B, and the lower width L are in a H<B>L relation and do not satisfy the conditional expression (5), by which the object is not omitted from the warning targets for the reason that the object is other than a pedestrian.

As described above, according to the vehicle surroundings monitoring apparatus in this embodiment, the widths H, B, and L of an object extracted from an infrared image are calculated in the plurality of vertical height positions h1, h2, and h3 of the object and an object type can be distinguished and determined with high reliability based on the characteristic of the calculated object widths H, B, and L in the plurality of height positions h1, h2, and h3.

While two infrared cameras 2R and 2L have been provided in this embodiment, it is also possible to mount one infrared camera 2R or 2L on the vehicle 10 in cases where a distance from the object is detected by radar or the like.

In addition, it is also possible to detect an object by using not only the infrared cameras 2R and 2L but also a visible light camera or radar.

What is claimed is:

1. A vehicle surroundings monitoring apparatus which has a computer including an interface circuit for accessing an image obtained by a camera mounted on a vehicle and detects a material body existing around the vehicle by the computer, wherein the computer performs:

an object extraction process for extracting an object from the image;

a width calculation process for calculating widths of the object in a plurality of height positions spaced at vertical intervals of the object extracted in the object extraction process;

an object type determination process for altering a preliminary determination that the type of the object is a pedestrian and determining the type of the object to be an other-than-pedestrian based on the widths calculated in the width calculation process, wherein the plurality of height positions include at least three height positions in an upper part, a center part, and a lower part of the object, the upper part being a position presumed to be a position of a head of a pedestrian in a case the object is presumed to be the pedestrian, the center part being a position presumed to be a position of a torso of the pedestrian in the case the object is presumed to be the pedestrian, the lower part being a position presumed to be a position of a leg of the pedestrian in the case the object is presumed to be the pedestrian, wherein the object type determination process unit determines the type of the object to be the other-than-pedestrian in a case where a width in the height position in the center part is larger than a width in the height position in the upper part, and also a width in the height position in the lower part is larger than the width in the height position in the center part; and a warning process which determines warning targets out of the objects extracted by the object extraction process unit and outputs warnings on the warning targets for a driver of the vehicle, wherein the warning process unit omits the object from the warning targets in the case where the object type determination process unit determines the object to be the other-than-pedestrian-type.

2. A vehicle surroundings monitoring apparatus according to claim 1, wherein the width calculation process calculates the width of a high-luminance portion whose luminance value in each of the height positions is equal to or higher than a predetermined value in the image of the object, as the width of the object in the height position.

3. A vehicle surroundings monitoring apparatus according to claim 1, wherein:

the object type determination process confirms the preliminary determination that the object type is the pedestrian in the case where the width in the center height position of the object is larger than the width in the upper height position and the width in the lower height position among the widths calculated by the width calculation process unit.

4. A vehicle surroundings monitoring apparatus according to claim 3, wherein the object type determination process determines the type of the object to be the other-than-pedestrian in the case where the widths in the height positions calculated by the width calculation process unit increase with lowering height position or in the case where the widths in the height positions are approximately the same as each other.

5. A vehicle surroundings monitoring method for detecting a material body existing around a vehicle by a computer including an interface circuit for accessing an image obtained by a camera mounted on the vehicle, comprising:
 an object extraction step in which the computer extracts an object from the image by the computer;
 a width calculation step in which the computer calculates widths of the object in a plurality of height positions spaced at vertical intervals of the object extracted in the object extraction step;
 an object type determination step in which the computer alters a preliminary determination that the type of the object is a pedestrian and determines the type of the object to be an other-than-pedestrian-type based on the widths calculated in the width calculation step, wherein the plurality of height positions include at least three height positions in an upper part, a center part, and a lower part of the object, the upper part being a position presumed to be a position of a head of a pedestrian in a case the object is presumed to be the pedestrian, the center part being a position presumed to be a position of a torso of the pedestrian in the case the object is presumed to be the pedestrian, the lower part being a position presumed to be a position of a leg of the pedestrian in the case the object is presumed to be the pedestrian, and wherein the object type determination step determines the type of the object to be the other-than-pedestrian in a case where a width in the height position in the center part is larger than a width in the height position in the upper part, and also a width in the height position in the lower part is larger than the width in the height position in the center part; and
 a warning step which determines warning targets out of the objects extracted by the object extraction step and outputs warnings on the warning targets for a driver of the vehicle, wherein the warning process step omits the object from the warning targets in the case where the object type determination step determines the object to be the other-than-pedestrian-type.

6. A vehicle surroundings monitoring method according to claim 5, wherein the width calculation step calculates the width of a high-luminance portion whose luminance value in each of the height positions is equal to or higher than a predetermined value in the image of the object, as the width of the object in the height position.

7. A vehicle surroundings monitoring method according to claim 5, wherein:
 the object type determination step confirms the preliminary determination that the object type is the pedestrian in the case where the width in the center height position of the object is larger than the width in the upper height position and the width in the lower height position among the widths calculated by the width calculation step.

8. A vehicle surroundings monitoring method according to claim 7, wherein the object type determination step determines the type of the object to be the other-than-pedestrian in the case where the widths in the height positions calculated by the width calculation step increase with lowering height position or in the case where the widths in the height positions are approximately the same as each other.

* * * * *